Oct. 26, 1965 W. W. SALISBURY 3,214,690

DEVICE FOR CONVERTING FROM RADIO FREQUENCY
POWER TO POWER FREQUENCY POWER

Filed March 2, 1962 2 Sheets-Sheet 1

INVENTOR.
Winfield W. Salisbury

BY Arthur M. Sloan

ATTORNEY

Oct. 26, 1965 W. W. SALISBURY 3,214,690

DEVICE FOR CONVERTING FROM RADIO FREQUENCY POWER TO POWER FREQUENCY POWER

Filed March 2, 1962 2 Sheets-Sheet 2

INVENTOR.
Winfield W. Salisbury

BY

Arthur M. Sloan
ATTORNEY

United States Patent Office 3,214,690
Patented Oct. 26, 1965

3,214,690

DEVICE FOR CONVERTING FROM RADIO FREQUENCY POWER TO POWER FREQUENCY POWER

Winfield W. Salisbury, Garland, Tex., assignor to Varo, Inc., Garland, Tex.

Filed Mar. 2, 1962, Ser. No. 177,066
9 Claims. (Cl. 325—26)

This invention relates to a device for converting from radio frequency power to power frequency power.

An object of this invention is to provide a device for converting from radio frequency power to power frequency power.

Another object of this invention is to provide a system for transmitting useable quantities of radio frequency power and converting such power to power frequency.

Still another object of this invention is to provide a device for converting from radio frequency power to power frequency power as extended to multiphase transmission.

Yet another object of this invention is to provide a wireless power transmission system.

A further object of this invention is to provide a device for converting power frequency power to directable radio frequency energy, directing said energy to a receiver, and reconverting said energy to power frequency power.

Other objects, aspects, uses, and advantages of the invention will become apparent from the following description and from the drawing.

Figure 1:
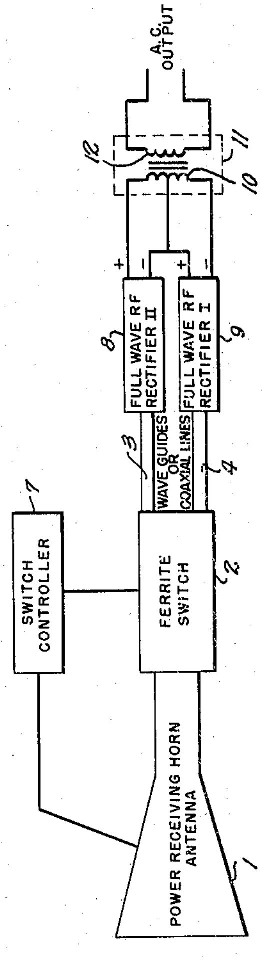
FIGURE 1 is a schematic diagram of a typical circuit embodying the features of the invention.

Referring to FIGURE 1, consider power receiving horn antenna 1 in place of which a suitable receiver of radio frequency power such as a dipole antenna may be used. Horn antenna 1 may or may not be used with a lens. The horn or dipole may be part of a larger power receiving complex.

Horn antenna 1 feeds radio frequency power to a rapid acting waveguide or coaxial ring switch such as the ferrite switch 2 in a waveguide 3 or 4 or a coaxial ring so as to switch between two input terminals 5 and 6. The rapid acting switch utilized in this system should be a radio frequency switch capable of acting at least as rapidly as the desired power frequency. Ferrite switches that will perform as required by this invention are well known in the art. Two such switches are shown in the shortform catalog of Airtron Inc., a Division of Litton Industries, dated March 1959, and referring to Ferroline, Flexaguide, and Guideline Products. Specifically note on page 5, ferrite RF switches reciprocal and non-reciprocal, Faraday rotational type and transverse field type. The ferrite switch has a D.C. winding which can be biased in several different ways. The ferrite switch rotates the plane of polarization of a microwave in an amount depending on the length and magnetic state of the ferrite. Each wave guide tolerates only one polarization.

Switching is controlled by switch controller 7. Input terminals 5 and 6 feed two full wave radio frequency rectifiers 8 and 9. As shown in FIG. 1 the switch controller 7 operates in response to a signal from the power receiving horn antenna 1 to switch the ferrite switch 2 from one wave guide 3 to the other wave guide 4 thus selecting the rectifier in operation at any given time.

The outputs of the rectifiers 8 and 9 are fed to the primary winding 10 of alternating current transformer 11 of suitable properties for utilizing the desired power frequency as input. Transformer 11 has secondary winding 12.

Figure 2:
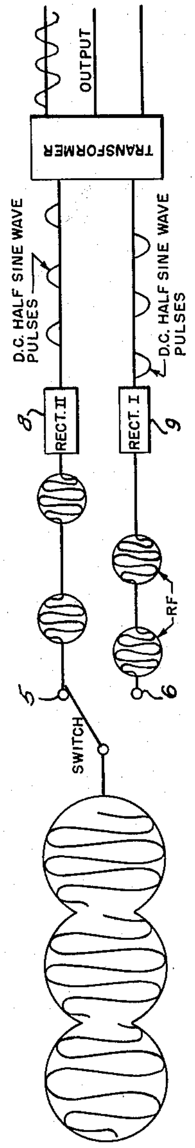
FIGURE 2 is a diagram of the wave forms in the circuit of FIGURE 1.

In operation, the ferrite switch 2 or other suitable switch is switched synchronously with the power frequency desired. Rectifiers 8 and 9 are so connected to the transformer 11 that each supplies one-half of the alternating current power frequency wave, first one and then the other, in proper sequence and alternating polarity as shown in FIGURE 2.

The efficiency of this device is augmented if the incoming radio frequency is modulated 100% by the power frequency. Efficiency is optimum if the envelope of this modulation consists of half sine waves of the power frequency as depicted in FIGURE 2.

This modulation controls the switching phase and rate of the radio frequency switch 2 which selects the rectifier in operation at any given time.

Figure 3:
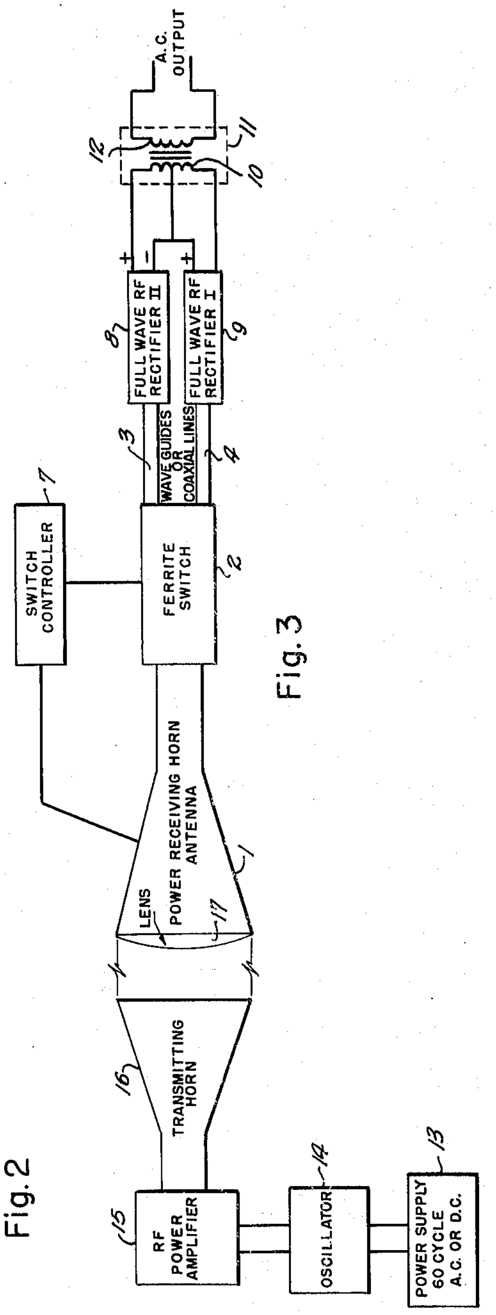
FIGURE 3 is a schematic diagram of a system for transmitting and converting radio frequency power to power frequency power. For purposes of representation, the transmitting horn is shown much closer to the receiving horn than is normally the case.

FIGURE 3 shows the system of FIGURE 1 adapted to transmit useable quantities of radio frequency power to the power receiving horn antenna 1. Power supply 13 supplies power frequency power such as 60 cycle alternating current or direct current to oscillator 14. Oscillator 14 provides radio frequency power to radio frequency power amplifier 15 and transmitting horn antenna 16 conveys the amplified radio frequency power to lens 17 of power receiving horn antenna 1. From this point operation of the device is as explained above for FIGURE 1.

The system of this invention transmits a continuous and modulated signal and demodulates so that full power is available in a low frequency alternating current. This invention does not add pulses to make continuous power as did Marconi about 1913 with the old timer spark discharge outfit. See "The Principles Underlying Radio Communication" (Second Edition) Radio Communication Pamphlet No. 40 prepared by the Bureau of Standards, Signal Corps, U.S. Army, Government Printing Office: 1922, pages 364 and 365. Also note "Practical Wireless Telegraphy" by E. E. Bucher, published by the Wireless Press, Inc., May 1918, pages 274 and 275.

By extending the basic system, it is possible to process multiphase power, i.e., power of more than one phase. The three phase system is an example which may be applied to two phase systems or any higher number of phases which may be desired. Equipment required in the three phase system is essentially the same as the equipment used for single phase transmission and conversion. In the three phase system, a means for controlling the percentage of modulation is needed. Modulation intensity required for three phase transmission is lower than that required for single phase transmission. In fact, modulation of the order of only a few percent is all that is required. Modulation of high order is expected to be detrimental to the operation of the three phase system.

Figure 4:
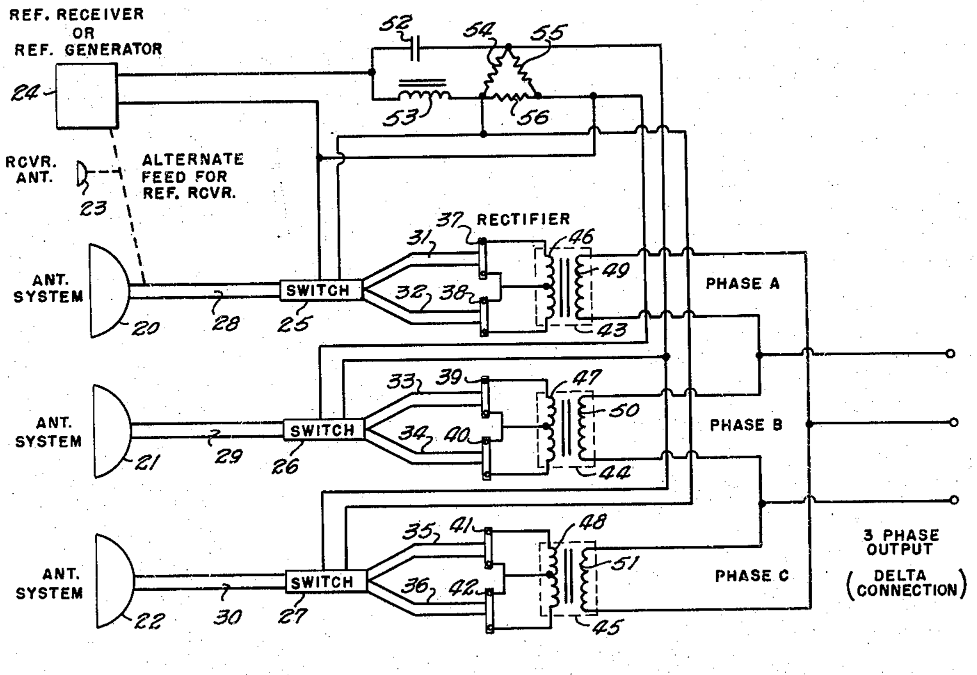
FIGURE 4 is a schematic diagram of the three phase power transmission and conversion system of this invention.

Equipment required at the receiving site of a three phase system is somewhat more complex than that required at the receiving site of a single phase installation. Referring to FIGURE 4, three separate antenna systems 20, 21, and 22 are required, one for each phase. In addition, a fourth antenna 23 may be used for the reference receiver or generator 24, although there is nothing to prevent sampling a portion of the wave in one of the three main antennas as a means of suplying the required signal to the reference receiver 24.

The key to the operation of the three phase system lies in the special circuitry used to supply the switch impulse to the switches 25, 26, and 27 which are included in each of the three main lines 28, 29, and 30. Each main line is equipped with all of the switching and rectifying equipment used in a single phase system. This includes waveguides 31, 32, 33, 34, 35, and 36, full wave radio frequency rectifiers 37, 38, 39, 40, 41, and 42, and transformers 43, 44, and 45 having primary windings 46, 47, and 48, and secondary windings 49, 50, and 51.

Figure 5:
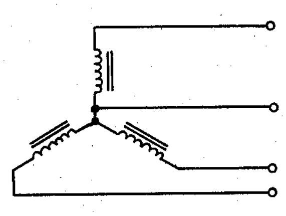
FIGURE 5 is a schematic diagram of the transformer secondaries of a three phase system connected in "Y."

The transformer output of each of the waveguide groups may be arranged with the transformer secondaries 49, 50, and 51 in either "delta" or "Y" at the discretion of the system designer. FIGURE 4 shows the secondaries connected in "delta" and FIGURE 5 shows the secondaries connected in "Y."

It is not essential that the special circuits be driven by the reference receiver 24. Instead they may be driven by a constant frequency source such as a precision tuning fork or a piezzoelectric crystal.

Power required for the operation of the frequency reference may be derived from any suitable source such as a local battery, portable power supply, solar battery, sample signal derived from a special separate antenna system which operates in the manner of a standard single phase system, or any other similar source of operating power.

Output of the reference source 24 is fed to a circuit containing a capacitor 52 and an inductor 53 of suitable constants to permit them to resonate at the frequency of the power line. The inductor 53 and capacitor 52 are connected to a group of three resistors, 54, 55, and 56, which are arranged in a suitable manner to permit their output to be used for the operation of the three sets of waveguide switches. The relationship of these components is such that the following equation is satisfied:

$$\sqrt{\frac{L}{C}}=\sqrt{3}R$$

at operating frequency.

Thus, the switch of each of the three waveguide systems is caused to operate 120° out of phase with its neighbor. The combined output of each phase section is therefore separated by a similar phase relationship which causes the total output of the system to be the required three phase output.

Any control and adjustment equipment which is required in this three phase system is inserted in its proper place in each of the three lines. The arrangement of the control equipment is the same as for a single phase system. See switch controller 7 in FIGURE 1.

An open or closed loop may be applied in either the single or multiphase system, and the same sensing and measuring arrangement may be used for the multiphase system as for the single phase system.

In this context, a closed loop system is intended to mean a system in which a power-transmitter power output level control is actuated by demand signals from the useful load on the reconverted power at the receiving output. These power demand signals may either be conveyed by means of an auxiliary channel transmitting power demand information from the receiver power load to the power transmitter level control or by means of reflected power from the receiving antennas setting up standing waves in the transmitting antenna feed. Such standing waves can be sensed at the transmitter and controlled by means of power level adjustment, provided the receiver is equipped with output voltage regulators which adjust the receiver antenna impedance loading. Either of these systems is a closed loop system.

An open loop system would require the transmitter to transmit at full power continuously and the receiver to reject the part of that power not required for useful power purposes.

Briefly, the three phase system may be described as the triplication of the single phase system with the addition of the necessary phase modification devices to allow the proper operation of the appropriate switching devices at the receiving end. The transmission end of the system is unchanged except for the reduction in modulation magnitude which is peculiar to the requirements of the system.

It will be apparent that the embodiments shown are only exemplary and that various modifications can be made in construction and arrangement within the scope of the invention as defined in the appended claims.

What I claim as my invention is:

1. A device for converting radio frequency power to power frequency power comprising a receiver of radio frequency power, means for guiding waves, rapid acting means for switching received radio frequency power from one means for guiding waves to another, means for rectifying the radio frequency power issuing from each means for guiding waves, and means responsive to the desired power frequency as input for transforming the rectified radio frequency power to a low frequency alternating current including means responsive to the received radio frequency power for controlling the operation of the means for switching received radio frequency power from one means for guiding waves to another so that such switching is synchronous with the power frequency desired.

2. A device for converting radio frequency power to power frequency power comprising a receiver of radio frequency power, means for guiding waves, rapid acting means for switching received radio frequency power from one means for guiding waves to another, means for rectifying the radio frequency power issuing from each means for guiding waves, and means responsive to the desired power frequency as input for transforming the rectified radio frequency power to a low frequency alternating current including means responsive to the received radio frequency power for controlling the operation of the means for switching received radio frequency power from one means for guiding waves to another so that such switching is synchronous with the power frequency desired wherein the receiver of radio frequency power is a power receiving horn antenna, the means for guiding waves includes two wave guides, the means for switching received radio frequency power from one means for guiding waves to another includes a ferrite switch, and the means for rectifying the radio frequency power includes two full wave radio frequency rectifiers.

3. A device for converting radio frequency power to power frequency power comprising a receiver of radio frequency power, means for guiding waves, rapid acting means for switching received radio frequency power from one means for guiding waves to another, means for rectifying the radio frequency power issuing from each means for guiding waves, and means responsive to the desired power frequency as input for transforming the rectified radio frequency power to a low frequency alternating current including means responsive to the received radio frequency power for controlling the operation of the means for switching received radio frequency power from one means for guiding waves to another so that such switching is synchronous with the power frequency desired, wherein the receiver of radio frequency power is a power receiving horn antenna, the means for guiding waves includes two wave guides, the means for switching received radio frequency power from one means for guiding waves to another includes a ferrite switch, the means for rectifying the radio frequency power includes two full wave radio frequency rectifiers, and the means for transforming the rectified radio frequency power to a low frequency alternating current comprises an alternating current transformer whose primary is connected to the two full radio frequency rectifiers so that each rectifier supplies one-half of the alternating current power frequency wave, first one and then the other, in proper sequence and alternating polartity.

4. A device for converting radio frequency power to multi-phase power frequency power comprising receivers of radio frequency power, means for guiding waves associated with each receiver of radio frequency, rapid acting means for switching received radio frequency power from one means for guiding waves to another, means for rectifying the radio frequency power issuing from each means for guiding waves, means responsive to the desired power frequency as input for transforming the rectified radio frequency power to a low frequency alternating current, and means controlling the operation of the switching means causing each of the switching means to operate 120° out of phase with its neighboring switching means.

5. A device for converting radio frequency power to multi-phase power frequency power as described in claim 4 wherein the receivers of radio frequency power include a separate power receiving horn antenna for each phase, the means for guiding waves includes two wave guides connected to each horn antenna, the means for switching received radio frequency power from one means for guiding waves to another includes a ferrite switch connected between each horn antenna and the two wave guides connected to such horn antenna, and the means for rectifying the radio frequency power includes a full wave radio frequency rectifier connected to each wave guide.

6. A device for converting radio frequency power to multi-phase power frequency power as described in claim 4 wherein the means controlling the operation of the switching means comprises a reference receiver receiving a signal, a circuit responsive to the output of the reference receiver, including a capacitor and an inductor to resonate at the frequency of the power line, and three resistors connected to the capacitor and inductor to permit their output to be used for the operation of the switching means.

7. A device for converting radio frequency power to multi-phase power frequency power as described in claim 6 wherein the inductor, capacitor, and three resistors are related in accordance with the equation $$\sqrt{\frac{L}{C}}=\sqrt{3}R$$

at operating frequency.

8. A device for converting radio frequency power to multi-phase power frequency power as described in claim 4 wherein the means for transforming the rectified radio frequency power to a low frequency alternating current includes alternating current transformers whose primaries are each connected to two full wave radio frequency rectifiers so that each rectifier supplies one-half of the alternating current power frequency wave, first one and then the other in proper sequence and alternating polarity and whose secondaries are connected to each other.

9. A system for transmitting radio frequency power and for converting such radio frequency power to power frequency power comprising a source of power frequency power, a means for rectifying the power frequency power supplied by such source to radio frequency power, a means for amplifying the rectified radio frequency power, a means for transmitting the amplified radio frequency power, a receiver of radio frequency power for receiving the transmitted radio frequency power, means for guiding waves of the received radio frequency power, rapid acting means for switching received radio frequency power from one means for guiding waves to another, means for rectifying the radio frequency power issuing from each means for guiding waves, means responsive to the desired power frequency as input for transforming the rectified radio frequency power to a low frequency alternating current, and means responsive to the received radio frequency power for controlling the operation of the means for switching received radio frequency power from one means for guiding waves to another so that such switching is synchronous with the power frequency desired.

References Cited by the Examiner

UNITED STATES PATENTS

| | | | |
|---|---|---|---|
| 1,578,881 | 3/26 | Duncan | 321—1 |
| 1,843,521 | 2/32 | Smith | 321—1 |
| 2,415,708 | 2/47 | Sciaky | 321—4 |
| 2,786,132 | 3/57 | Rines | 325—14 |
| 2,813,242 | 11/57 | Crump | 325—492 |
| 3,044,003 | 7/62 | Stavis et al. | 321—3 |

DAVID G. REDINBAUGH, *Primary Examiner.*